US009563363B2

(12) United States Patent
Chang

(10) Patent No.: US 9,563,363 B2
(45) Date of Patent: Feb. 7, 2017

(54) FLEXIBLE STORAGE BLOCK FOR A SOLID STATE DRIVE (SSD)-BASED FILE SYSTEM

(71) Applicant: EMPIRE TECHNOLOGY DEVELOPMENT LLC, Wilmington, DE (US)

(72) Inventor: Hui Huang Chang, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/435,747

(22) PCT Filed: Sep. 27, 2013

(86) PCT No.: PCT/US2013/062065
§ 371 (c)(1),
(2) Date: Apr. 15, 2015

(87) PCT Pub. No.: WO2015/047284
PCT Pub. Date: Apr. 2, 2015

(65) Prior Publication Data
US 2015/0261436 A1    Sep. 17, 2015

(51) Int. Cl.
*G06F 12/00* (2006.01)
*G06F 3/06* (2006.01)
(Continued)

(52) U.S. Cl.
CPC ............. *G06F 3/061* (2013.01); *G06F 3/0655* (2013.01); *G06F 3/0688* (2013.01);
(Continued)

(58) Field of Classification Search
None
See application file for complete search history.

(56) References Cited

U.S. PATENT DOCUMENTS

| 6,038,636 A * | 3/2000 | Brown, III | G06F 12/0246 |
| | | | 711/103 |
| 6,098,077 A * | 8/2000 | Sassa | G06F 11/1068 |
| | | | 707/999.202 |

(Continued)

OTHER PUBLICATIONS

International Search Report and Written Opinion of the International Searching Authority, International application No. PCT/US2013/062065, Jun. 18, 2014.

(Continued)

*Primary Examiner* — Kaushikkumar Patel
(74) *Attorney, Agent, or Firm* — Ren-Sheng International

(57) ABSTRACT

Techniques generally described are related to a flexible storage block based on solid state devices. One example method to update data stored in a storage block may include maintaining, by a flash storage module, a cluster link in the storage block for storing a file, wherein the cluster link links together a plurality of data clusters that are storage spaces provided by one or more solid state devices. The method may include, in response to a first request to update data stored in a first data cluster amongst the plurality of data clusters, allocating a second data cluster to store the updated data. The method may further include linking the second data cluster to the cluster link, wherein the linking the second data cluster to the cluster link invalidates the first data cluster in the cluster link.

20 Claims, 8 Drawing Sheets

(51) Int. Cl.
*G06F 13/38* (2006.01)
*G06F 12/02* (2006.01)

(52) U.S. Cl.
CPC ........ *G06F 13/385* (2013.01); *G06F 12/0246* (2013.01); *G06F 2212/7202* (2013.01)

(56) References Cited

U.S. PATENT DOCUMENTS

| | | | |
|---|---|---|---|
| 7,433,993 B2* | 10/2008 | Sinclair | G06F 12/0246 |
| | | | 711/103 |
| 8,120,990 B2 | 2/2012 | Kim | |
| 2003/0018847 A1* | 1/2003 | Katayama | G06F 3/0601 |
| | | | 711/103 |
| 2005/0097142 A1 | 5/2005 | Best et al. | |
| 2006/0036802 A1* | 2/2006 | Drukin | G06F 17/30067 |
| | | | 711/103 |
| 2006/0179211 A1* | 8/2006 | Aasheim | G06F 3/0619 |
| | | | 711/103 |
| 2009/0265403 A1* | 10/2009 | Fukumoto | G06F 12/0246 |
| 2010/0049755 A1 | 2/2010 | Best et al. | |
| 2010/0082537 A1* | 4/2010 | Lasser | G06F 3/0608 |
| | | | 707/610 |
| 2011/0022566 A1 | 1/2011 | Beaverson et al. | |
| 2011/0055467 A1* | 3/2011 | Maeda | G06F 3/0608 |
| | | | 711/103 |
| 2011/0145306 A1 | 6/2011 | Boyd et al. | |
| 2012/0096217 A1 | 4/2012 | Son et al. | |
| 2013/0054873 A1 | 2/2013 | Belluomini et al. | |
| 2013/0111118 A1 | 5/2013 | Moshayedi et al. | |

OTHER PUBLICATIONS

Hyunchul Park et al., "Buffer Flush and Address Mapping Scheme for Flash Memory Solid-State Disk", Journal of Systems Architecture, 2010, pp. 208-220, vol. 56.

Drew Roselli et al., "A Comparison of File System Workloads", Proceedings of 2000 USENIX Annual Technical Conference, Jun. 18-23, pp. 15.

* cited by examiner (600) A computer program product (602) Signal bearing medium (604) at least one of one or more instructions for maintaining, by a flash storage module, a cluster link in a flexible storage block for storing a file, wherein the cluster link contains a plurality of data clusters which utilize storage spaces provided by one or more solid state devices;

in response to a first request to update data stored in a first data cluster selected from the plurality of data clusters, allocating, by the flash storage module, a second data cluster to the cluster link for storing the updated data, wherein the second data cluster is not one of the plurality of data clusters; and linking, by the flash storage module, the second data cluster to the cluster link, wherein the linking of the second data cluster to the cluster link invalidates the first data cluster in the cluster link.

| (606) A computer readable medium | (608) A recordable medium | (610) A communications medium |

Fig. 6

FLEXIBLE STORAGE BLOCK FOR A SOLID STATE DRIVE (SSD)-BASED FILE SYSTEM

CROSS-REFERENCE TO RELATED APPLICATION

The present application is a U.S. national stage filing under 35 U.S.C. §371 of International Application No. PCT/US2013/062065, filed Sep. 27, 2013, entitled "FLEXIBLE STORAGE BLOCK FOR A SOLID STATE DRIVE (SSD)-BASED FILE SYSTEM." The International Application, including any appendices or attachments thereof, is hereby incorporated by reference in its entirety.

BACKGROUND

The performance of a file system may be highly dependent on the latency or throughput of a data storage device on which the file system is based. Solid state devices may offer good read performance, good random access speed, and low energy consumption in providing storage services. However, data throughput of the solid state device may be limited by the throughput of the interface (e.g., USB 2.0 or SATA) that the solid state device is coupled with. The performance of the solid state device may also be unbalanced depending on whether the solid state device is performing a read operation or an update operation.

According to one example statistical analysis, the percentage of small files (files with sizes that are under 16 KB) in a particular file system may be higher than 50%. In some situations, up to 88% of files may be small files in certain types of file systems. Since these file systems may allocate at a minimum one flash page for storing a file regardless of the size of the file, the probability of wasting storage space in the solid state device may be great, as most of the stored files have sizes that are smaller than the size of the flash page.

SUMMARY

In accordance with some embodiments of the present disclosure, a method to update data stored in a storage block may include maintaining, by a flash storage module, a cluster link in the storage block to store a file, wherein the cluster link links together a plurality of data clusters that are storage spaces provided by one or more solid state devices. The method may include, in response to a first request to update data stored in a first data cluster amongst the plurality of data clusters, allocating, by the flash storage module, a second data cluster to store the updated data. The method may further include linking, by the flash storage module, the second data cluster to the cluster link, wherein the linking the second data cluster to the cluster link invalidates the first data cluster in the cluster link.

In accordance with other embodiments of the present disclosure, another method to store data in a storage volume may include maintaining, by a flash storage module, a plurality of storage blocks utilizing storage spaces provided by one or more solid state devices. The method may include constructing, by the flash storage module, a cluster link to store a file, wherein the cluster link links together a plurality of data clusters each of which is a storage location that is located in one of the plurality of storage blocks. In response to an update request to update the file, the method may include identifying, by the flash storage module, a first data cluster in the plurality of data clusters that is associated with updated data in the file. The method may further include allocating, by the flash storage module, a second data cluster in any one of the plurality of storage blocks that has available space to store the updated data, and linking, by the flash storage module, the second data cluster to the cluster link, wherein the linking the second data cluster to the cluster link invalidates the first data cluster in the cluster link.

In accordance with further embodiments of the present disclosure, a system to manage flash data storage may include a solid state device configured to provide a plurality of flash pages. The system may further include a flash storage module coupled with the solid state device. The flash storage module may be configured to maintain a storage block utilizing storage spaces provided by the solid state device, and construct a cluster link to store a file in the storage block, wherein the cluster link links together a plurality of data clusters each of which utilizes one of the plurality of flash pages to store data associated with the file. In response to a request to update data stored in a first data cluster amongst the plurality of data clusters, the flash storage module may further be configured to allocate a second data cluster in the storage block to store the updated data, and link the second data cluster to the cluster link to invalidate the first data cluster.

In accordance with additional embodiments of the present disclosure, a non-transitory computer-readable storage medium may have a set of instructions which, when executed by a computing processor, cause the computing processor to perform a method to update data stored in a storage block. The method may include maintaining, by a flash storage module, a cluster link in the storage block to store a file, wherein the cluster link links together a plurality of data clusters that are storage spaces provided by one or more solid state devices. The method may include, in response to a first request to update data stored in a first data cluster amongst the plurality of data clusters, allocating, by the flash storage module, a second data cluster to the cluster link to store the updated data. The method may further include linking, by the flash storage module, the second data cluster to the cluster link, wherein the linking the second data cluster to the cluster link invalidates the first data cluster in the cluster link.

In accordance with additional embodiments of the present disclosure, a non-transitory computer-readable storage medium may have a set of instructions which, when executed by a computing processor, cause the computing processor to perform a method to store data in a storage volume. The method may include maintaining, by a flash storage module, a plurality of storage blocks utilizing storage spaces provided by one or more solid state devices, and constructing, by the flash storage module, a cluster link to store a file, wherein the cluster link links together a plurality of data clusters each of which is a storage location that is located in one of the plurality of storage blocks. In response to an update request to update the file, the method may include identifying, by the flash storage module, a first data cluster in the plurality of data clusters that is associated with updated data in the file; allocating, by the flash storage module, a second data cluster in any one of the plurality of storage blocks that has available space to store the updated data; and linking, by the flash storage module, the second data cluster to the cluster link, wherein the linking the second data cluster to the cluster link invalidates the first data cluster in the cluster link.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 shows an illustrative embodiment of an example computer program product.

DETAILED DESCRIPTION

Figure 1:
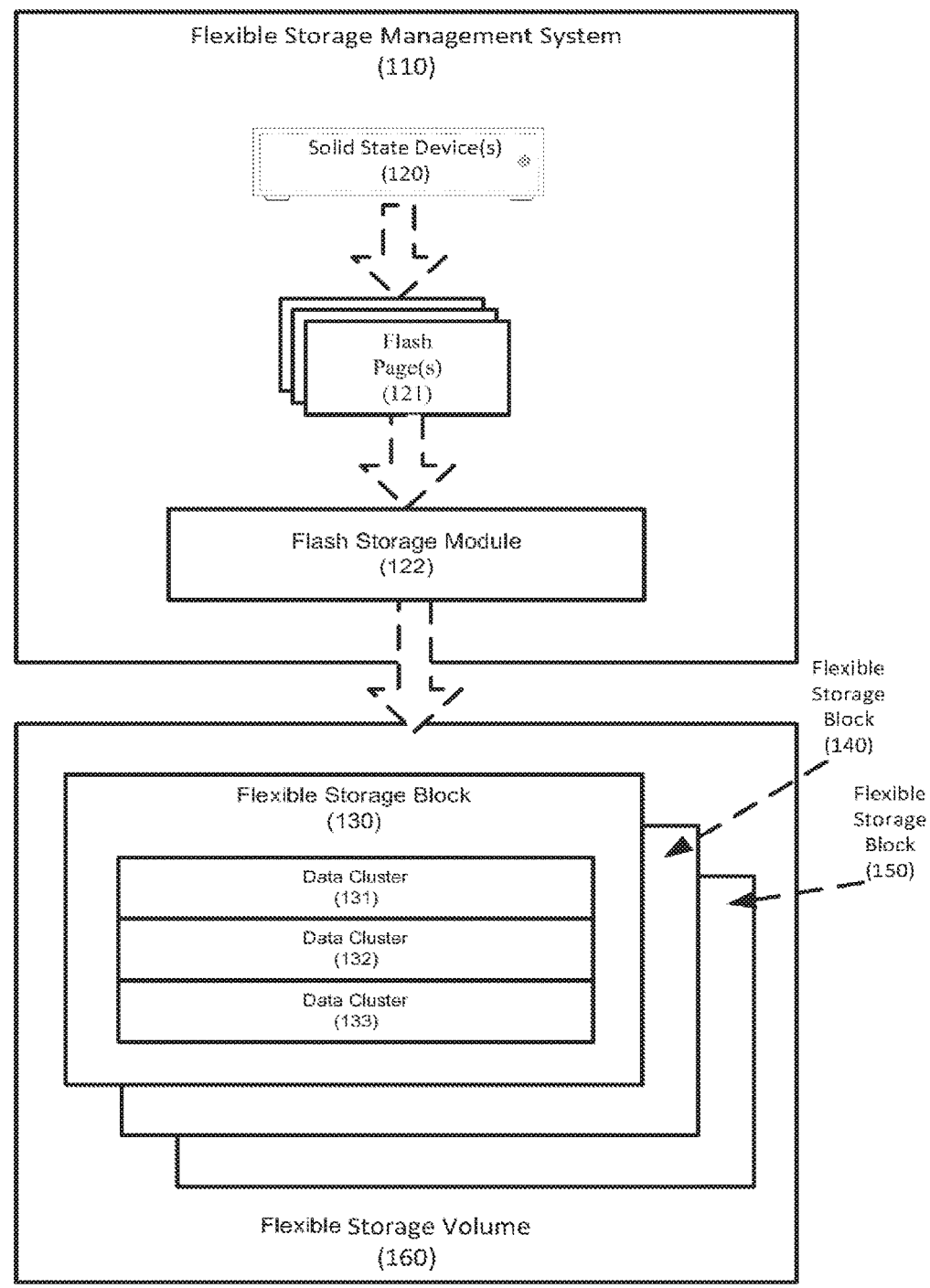
FIG. 1 shows a block diagram illustrating embodiments of a storage management system configured to provide flash-based flexible storage blocks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatuses, computer programs, and systems related to a flexible storage block based on solid state devices.

FIG. 1 shows a block diagram illustrating embodiments of a storage management system configured to provide flash-based flexible storage blocks. In FIG. 1, a flexible storage management system 110 may be a computer system configured to store and retrieve data on behalf of one or more client applications (not shown in FIG. 1). The flexible storage management system 110 may be configured with one or more solid state devices 120 (such as SSD-based devices/configurations), and a flash storage module 122 operatively coupled to the solid state devices 120 and configured to process file-level data requests and/or block-level data requests received from the client application(s). The flexible storage management system 110 may be implemented using a storage server, personal computer (PC), workstation, laptop, tablet PC, handheld computing/communication device, cell phone, smart phone, or other electronic device. Moreover, the flexible storage management system 110 may be implemented based on a computing device further described below.

In some embodiments, the flash storage module 122 may configure the non-volatile flash memories in the solid state devices 120 into a set of flash pages 121, each of which may have a size of e.g., 2K, 4K, or 8K bytes or other size. The flash storage module 122 may then perform flash-page based read and write operations on the solid state devices 120, in which each read or write operation may affect at least one flash page 121. The flash storage module 122 may further configure multiple flash pages 121 (e.g., 32 to 128 flash pages) into a flash block, and perform flash-block based update and erase operations on the solid state devices 120. A flash-block based operation may affect at least one flash block at a time.

In some embodiments, according to the characteristics of the flash memory, a blank flash page 121 with no data stored may initially contain "1" bits and no "0" bits. A "write operation" (an operation to store data to a blank flash page) performed on a blank flash page may change one or more of the "1" bits in the blank flash page to "0" bits. After the write operation, the flash storage module 122 may perform multiple read operations to retrieve data from the flash page. Optionally, the flash storage module 122 may perform a "partial-update operation" on a flash page that has gone through a write operation. The partial-update operation may change one or more of the remaining "1" bits in the flash page into "0" bits, but may not change any "0" bit into "1" bit. For example, a flash page may initially contain "111" in its flash storage units. A write operation may store "110" to the flash page, and a subsequent partial-update operation may change the flash page to "100", "010", or "000." However, no write or partial-update operation may change any "0" bits in the flash page back to "1" bits.

In some embodiments, to change one or more "0" bits in a specific flash page to "1" bits, the flexible storage module may perform an update operation on the flash block where the specific flash page is located. The "update operation" may be a combination of an "erase" operation performed on the flash block followed by write operations on the flash block including a write operation on the specific flash page. Specifically, the erase operation may "flash" all the "0" bits in the flash block into "1" bits, thereby erasing all data stored in the flash block. Afterward, the flash storage module may restore the data originally stored in the flash pages (except the specific flash page) of the flash block, and then apply the write operation to store the changed data to the specific flash page. Thus, updating a single flash page may involve the erasing and rewriting of a whole flash-block of data the specific flash page contained therein. As a result, a conventional update/erase operation may have a low throughput as compared to a read/write operation.

In some embodiments, the flash storage module 122 may configure the flash pages 121 into one or more flexible storage volumes 160, each of which may contain one or more flexible storage blocks 130, 140, and 150, etc. Three flexible storage blocks 130, 140, and 150 are shown in FIG. 1 for purposes of illustration, and any suitable number for flexible storage blocks may be provided. Further, the flash storage module 122 may configure one or more data clusters (e.g., data clusters 131, 132, and 133), which are data in one of the flexible storage blocks 130, 140, and 150, using flash memories provided by one or more flash pages 121 (e.g., 32 to thousands of flash pages). The size of the data clusters in one flexible storage block (e.g., the flexible storage block 130) may differ from the size of the data clusters in another flexible storage (e.g., the flexible storage block 140). The flexible storage blocks in the flexible storage volume 160 may form one or more link-lists (referred to as block links), with one flexible storage block referring to the next flexible storage block on each of the block link. Further, the data clusters in a single flexible storage block may also form one or more link-lists (referred to as cluster links).

In some embodiments, compared to a conventional write operation which uses a minimum of one flash page 121, the flash storage module 122 may utilize one or more data clusters in a flexible storage block to store a piece of data. By configuring the size of the data cluster to be smaller than the size of the flash page 121, the flash storage module 122 may store multiple small files to a space that is conventionally allocated to store a single small file. Further, the flash storage module 122 may update the data stored in a data cluster by "marking" the data cluster as "invalid", and allocate a new data cluster to store the updated data. As a result, the flash storage module 122 no longer needs to erase a whole flash block of data in order to update a single piece of data. Thus, the flexible storage blocks and data clusters not only provide better utilization of the flash storage spaces for the solid state devices 120 than the conventional flash pages and flash blocks do, but also greatly improve the performance of update operations for the solid state devices 120.

Figure 2A:
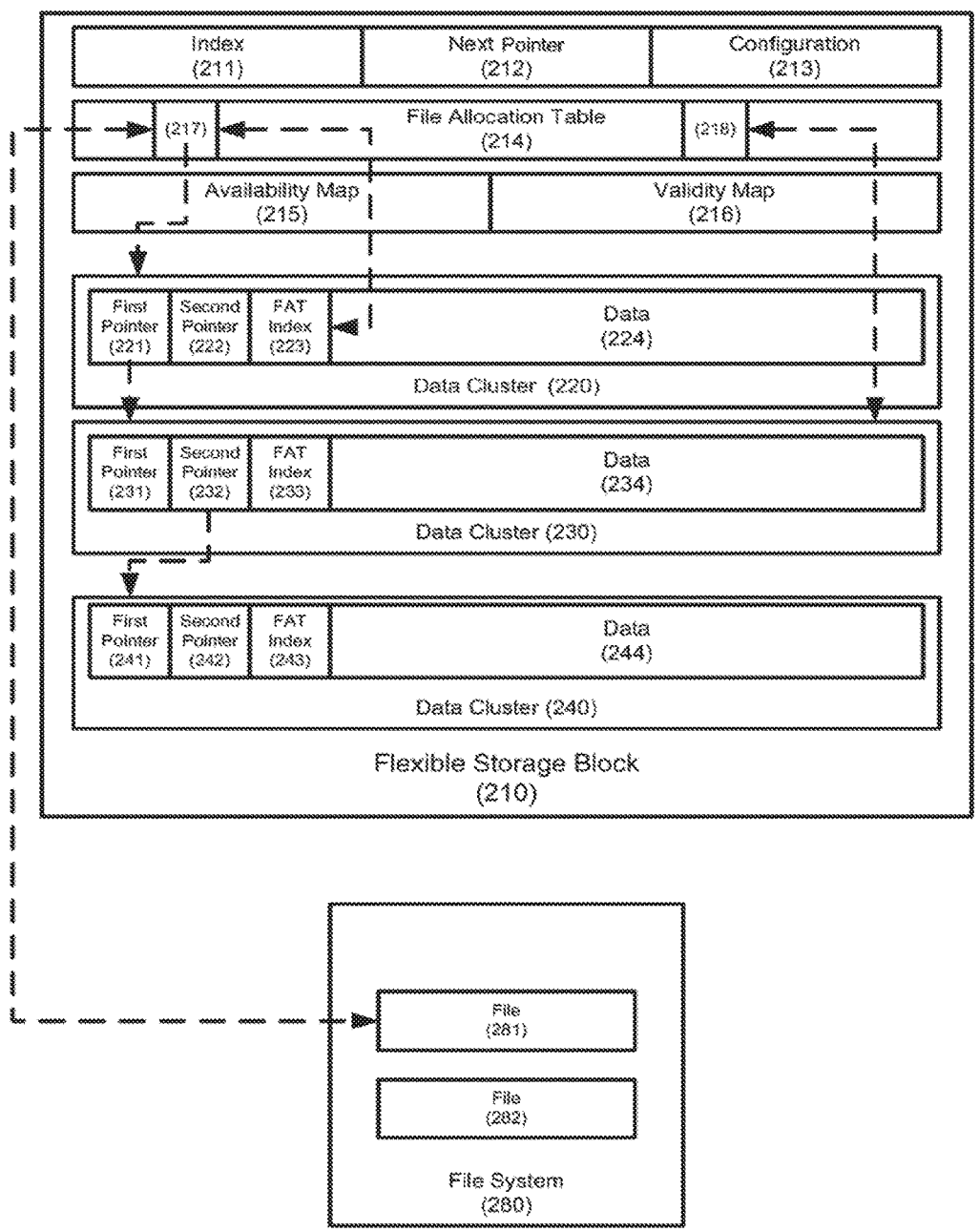
FIG. 2A shows illustrative embodiments of a flexible storage block configured with a double-linking mechanism.

FIG. 2A shows illustrative embodiments of a flexible storage block configured with a double-linking mechanism. In FIG. 2A, a flexible storage block 210, which may be similar to the flexible storage block 130, 140, or 150 of FIG. 1, may contain, among other fields and components, an "index" field 211, a "next pointer" field 212, a "configuration" field 213, a "file allocation table" ("FAT") 214, an "availability map" 215, and a "validity map" 216. Further, the flexible storage block 210 may contain one or more data clusters 220, 230, and 240, each of which may be similar to the data cluster 131, 132, or 133 of FIG. 1. Each of the data clusters 220, 230, and 240 may contain, among other fields, a "first pointer" field (e.g., first pointer 221), a "second pointer" field (e.g., second pointer 222), a "FAT index" field (e.g., FAT index 223), and a "data" section (e.g., data section 224).

In some embodiments, a flash storage module (similar to the flash storage module 122 of FIG. 1, not shown in FIG. 2A) may be configured to allocate the flexible storage block 210 based on a particular and configurable set of flash pages (e.g., 32 flash pages). The flash storage module may assign a unique identifier to an "index" field 211 of the flexible storage block 210, in order to identify the flexible storage block 210 in a flexible storage volume (such as the flexible storage volume 160 of FIG. 1, not shown in FIG. 2A). The flash storage module may allocate an additional flexible storage block in the flexible storage volume, and utilize the "next pointer" field 212 to reference the additional flexible storage block from the flexible storage block 210. The details of the "next pointer" field 212 and the flexible storage volume may be further described below.

In some embodiments, the flash storage module may construct multiple data clusters in the flexible storage block 210. Each data cluster may be deemed a storage unit configured to store a piece of data. Further, each data cluster may be configured with linking mechanisms to link with other data clusters. The size of the data cluster may be particular and configurable based on the "configuration" field 213 in the flexible storage block 210. In other words, the flash storage module may construct a data cluster with a size that is defined by the configuration field 213. For example, the flash storage module may construct a data cluster having the same size as a flash page. Alternatively or additionally, the flash storage module may create a data cluster with a size that is smaller than the size of the flash page. Having a smaller sized data cluster allows more small files to be stored in the flexible storage block 210, since each small file may take at a minimum one data cluster for storage. In some embodiments, the size of the data cluster in one flexible storage block 210 may be different from the size of the data cluster in another flexible storage block, as each flexible storage block has its own configuration field 213 to configure the size of the data clusters contained therein.

In some embodiments, the flash storage module may utilize the file allocation table ("FAT") 214 to store/retrieve data to/from the one or more data clusters 220, 230, and 240. For example, a file system 280 (which may be a file system in Microsoft Windows®, Linux®, Solaris® x86, NetWare, FreeBSD, Apple® iOS, Android®, or any other operating system) may contain one or more files 281 and 282. Each of the files 281 and 282 may be deemed a logical set of data having a size ranging from one or more bytes to any size that is supported by the file system 280. The flash storage module may be configured to provide data storage services for the file system 280. In other words, the flash storage module may store the logical set of data contained in a specific file (e.g., file 281) to a cluster link of data clusters 220, 230, and 240 in a flexible storage block 210 or in multiple flexible storage blocks. Thus, each cluster link may be deemed a flexible storage structure to store the specific file. Afterward, the flash storage module may utilize the FAT 214 to retrieve the logical set of data from the cluster link of data clusters when the file system 280 requests for the file 281.

In some embodiments, the FAT 214 may contain a set of "FAT entries", each of which associates a specific file in the file system 280 with a corresponding data cluster in the flexible storage block 210. For example, the file 281 may be associated with the FAT entry 217, and the flash storage module may be configured to identify the FAT entry 217 from the FAT 214 based on a logical address of the file 281. Based on the FAT entry 217, the flash storage module may locate the data cluster 220 from the flexible storage block 210. Specifically, the FAT entry 217 may be assigned with a "cluster address" associated with an address of the data cluster 220 in the flexible storage block 210. Thus, the flash storage module may retrieve the cluster address from the FAT entry 217, and utilize this cluster address to locate the specific data cluster 220. Afterward, the flash storage module may access data which belongs to the file 281, and is stored in the data section 224 of the data cluster 220.

In some embodiments, a single data cluster 220 may not be sufficient to store all the data for the file 281. In this case, the flash storage module may construct a cluster link having multiple data clusters to store the data for the file 281. The "cluster link" may be an array or a link-list of data clusters distributed in one or more flexible storage blocks. Each data cluster in the cluster link may have a pointer configured to reference a subsequent data cluster in the cluster link, which may be located in any place in the flexible storage block 210 or in another flexible storage block in the flexible storage volume. In one embodiment, the cluster link may have a data cluster acting as a "head" of the cluster link, and another data cluster acting as a "tail" of the cluster link. In other words, no other data cluster references the head data cluster, and the tail data cluster does not reference another data cluster. Any of the other data clusters in the cluster link that is neither "head" nor "tail" may have a "previous" data cluster in the cluster link referencing it, and may reference a "next" data cluster in the cluster link. Thus, the data cluster 220 that is referenced by the FAT entry 217 in the FAT 214 may be a "head" data cluster for a specific cluster link in the flexible storage block 210. In other embodiments, any one or more of the data clusters may have a pointer that points to at least one other data cluster in the cluster link, where the at least one other data cluster is not necessarily the immediately "previous" or the immediately "next" data cluster, such that the pointer(s) in the one or more data clusters need not refer to data clusters that are in-sequence.

In some embodiments, the flash storage module may allocate a second data cluster 230 (or more data clusters) in the flexible storage block 210 to store additional data in the file 281 that cannot be stored in a single data cluster 220. After allocation of the second data cluster 230, the flash storage module may store the cluster address of the data cluster 230 in the first pointer field 221 of the data cluster 220, and store the additional data of the file 281 to the data section 234 of the data cluster 230. Thus, the first pointer field 221 may serve as a pointer to reference the second data cluster 230 from the data cluster 220. And the flash storage module may locate data for the file 281 by using the FAT entry 217 to first identify the data cluster 220, and using the first pointer field 221 of the data cluster 220 to identify the data cluster 230.

In some embodiments, the flash storage module may store the cluster address of the data cluster 230 to a FAT entry 218 in the FAT 214, and store the reference to the FAT entry 218 to the first pointer field 221 of the data cluster 220. Thus, the flash storage module may be able to locate the data cluster 230 by identifying the FAT entry 218 based on the first pointer field 221 of the data cluster 220, and identifying the data cluster 230 using the cluster address stored in the FAT entry 218. In other words, the flash storage module may utilize the FAT entries in the FAT 214 as a part of the linking mechanism for the cluster link in the flexible storage block 210.

In some embodiments, the data cluster 220 may contain a FAT index 223 configured to reconstruct the FAT 214 when the FAT 214 becomes inaccessible or corrupted. Specifically, the FAT index 223 may contain some or all the information stored in the FAT entry 217, and the flash storage module may retrieve the information from the FAT index 223, and reconstruct the FAT entry 217 in the FAT 214. Alternatively, the FAT index 223 may further contain relevant information associated with the flexible storage block 210, so that the flash storage module may reconstruct the flexible storage block 210 if any of its meta-data are missing or corrupted.

In some embodiments, the flash storage module may receive a data request, seeking to update "old data" stored in a specific data cluster with "update data" transmitted via the request. The flash storage module may perform a partial-update operation to store the update data to the flexible storage block 210, while avoiding performing a conventional update operation to a whole flash block. Specifically, the partial-update operation may involve the marking of the "old data" as invalid, and the redirecting of any request for the "old data" to the "update data" stored in the flexible storage block 210. Further, the marking of the old data and the redirecting to the update data may not involve updating any "0" bits in the flexible storage block 210 to "1" bits.

In some embodiments, the flash storage module may utilize a second linking mechanism to mark the old data as invalid and redirect to the update data. Specifically, the second linking mechanism may be the "second pointer" fields in the data clusters, each second pointer field having a default/initial value (e.g., 0xFFFF) with one or more "1" bits and no "0" bit. For a specific data cluster, its second pointer field having the default/initial value may indicate that the specific data cluster is valid. To update the second pointer field to reference the update data, the flash storage module may perform a partial-update operation on the flash page that contains the second pointer field. The partial-update operation may change one or more "1" bits in the initial value to "0" bits. As a result, the second pointer field may contain a different value than the default/initial value, and the different value may indicate that the specific data cluster is no longer valid.

For example, the flash storage module may receive an update request to update data stored in the file 281. The flash storage module may identify the cluster link (including data clusters 220 and 230) that contains data for the file 281, and identify that the update data may be located in the data cluster 230. The flash storage module may then allocate a new data cluster 240 in the flexible storage block 210, and store the update data to the data section 244 of the data cluster 240. Afterward, the flash storage module may assign the first pointer field 241 of the data cluster 240 with values in the first pointer field 231 of the data cluster 230, and update the second pointer field 232 of the data cluster 230 to reference the data cluster 240. The updating of the second pointer field 232 may invalidate the data cluster 230. And the data cluster 240 may now act as a substitute of the data cluster 230 in the cluster link.

Subsequently, when the flash storage module receives a read request for data associated with the file 281, it may identify the cluster link (now including data clusters 220, 230, and 240) associated with the file 281, and retrieve data by traversing the cluster link. The flash storage module may first locate the data cluster 220 and determine that the data cluster 220 is valid. The flash storage module may then retrieve data from the data section 224 of the data cluster 220, and identify the data cluster 230 based on the first pointer field 221 of the data cluster 220. Upon a determination that the data cluster 230 is no longer valid due to its second pointer field 232 not equaling to the default/initial value, the flash storage module may utilize the second pointer field 232 to locate the data cluster 240. Once the flash storage module determines that the data cluster 240 is valid, it may retrieve data from the data section 244 of the data cluster 240.

Figure 2B:
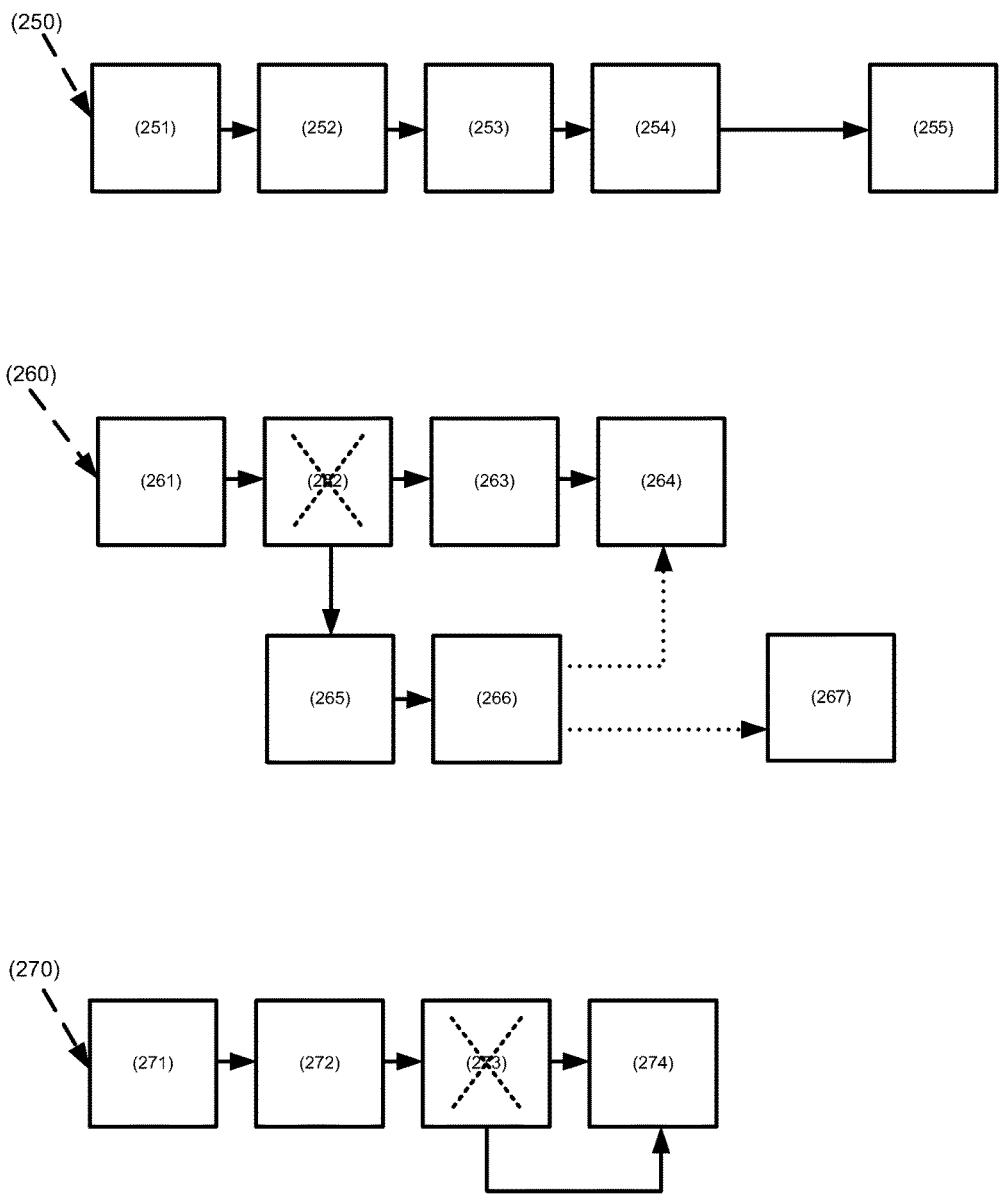
FIG. 2B shows illustrative scenarios of update operations performed on a cluster link.

FIG. 2B shows illustrative scenarios of update operations performed on a cluster link. In some embodiments, the flash storage module may receive an update request to append data to a file, which is stored in a cluster link 250 including data clusters 251, 252, 253, and 254. In this case, the flash storage module may allocate one or more new data clusters (e.g., data cluster 255) for the appending data, either in the same flexible data block (e.g., flexible data block 210 of FIG. 2A) as the data clusters 251, 252, 253, and 254, or in a different flexible data block. Afterward, the flash storage module may add the new data cluster 255 to the cluster link 250 by assigning the first pointer field of the data cluster 254 to point to the new data cluster 255.

In some embodiment, the flash storage module may receive an update request to update data in a file, which may be stored in a cluster link 260 including data clusters 261, 262, 263, and 264. In this case, the flash storage module may identify that the "update data" being located in the existing data clusters 262 and 263, and allocate one or more new data clusters (e.g., data clusters 265 and 266) for the update data. Afterward, the flash storage module may add the new data clusters 265 and 266 to the cluster link 260 by assigning the second pointer of the data cluster 262 to point to the data cluster 265, assigning the first pointer of the data cluster 265 to point to the data cluster 266. The first pointer of the data cluster 266 may also be copied from the first pointer of the data cluster 263. Thus, the data cluster 262 may be deemed invalid since its second pointer no longer equals to the initial value. Further, the data cluster 263, which is referenced by the first pointer of the data cluster 262, may no longer be accessible via the data cluster 262, and may optionally be deemed invalid. As a result, the effective cluster link 260 may contain data clusters 261, 265, 266, and 264. It should be noted that the first pointer of the data cluster 266 may not point to the data cluster 264 and may instead point to a data cluster 267. In some embodiments, if the size of the data cluster 265 and the size of the data cluster 266 equal to the size of the data cluster 262 and the size of the data cluster 263, respectively, then the data cluster 266 may be linked to the data cluster 264.

In some embodiment, the flash storage module may receive an update request to delete data from a file, which is stored in a cluster link 270 including data clusters 271, 272, 273, and 274. In this case, the flash storage module may identify that the "delete data" being located in the existing data cluster 273. Afterward, the flash storage module may effectively "remove" the data clusters 273 from the cluster link 270 by assigning the second pointer of the data cluster 273 to point to the data cluster 274. Thus, the data cluster 273 may be deemed invalid since its second pointer no longer equals to the default/initial value. And the effective update cluster link 270 may contain data clusters 271, 272, and 274. Thus, by using a flexible storage block with double-link mechanism, the flash storage module may update the data stored in the flexible storage block without performing an erase operation on the flash block the update data is located.

Figure 3:
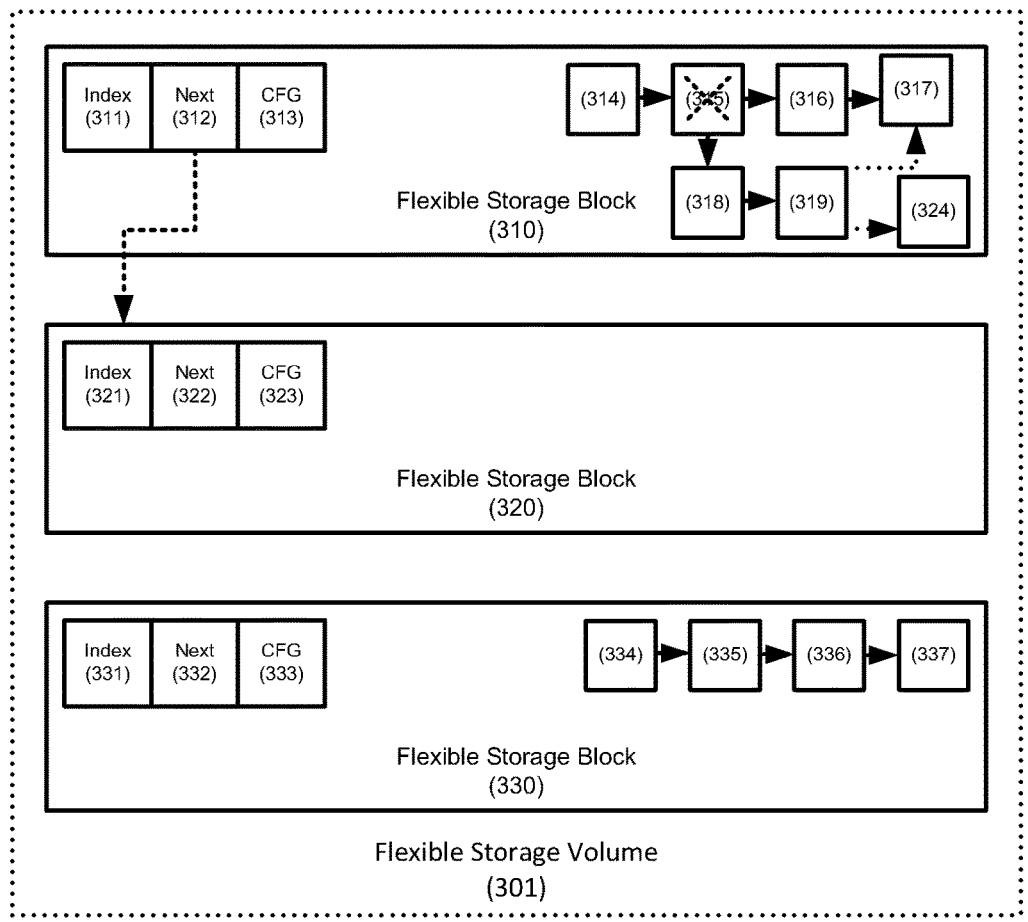
FIG. 3 shows illustrative embodiments of a flexible storage volume having multiple flexible storage blocks.

FIG. 3 shows illustrative embodiments of a flexible storage volume having multiple flexible storage blocks. In FIG. 3, the flexible storage volume 301, which may be similar to the flexible storage volume 160 of FIG. 1, may contain, among other fields and components, one or more flexible storage blocks 310, 320, and 330. Each of the flexible storage blocks 310, 320, and 330 may contain, among other fields and components, an index field (e.g., index field 311), a next pointer field (e.g., NEXT field 312), a configuration field (e.g., CFG field 313), and one or more data clusters (not shown in FIG. 3). A flash storage module (similar to the flash storage module 122 of FIG. 1, not shown in FIG. 3) may construct a block link among the flexible storage blocks 310 and 320, by using the next pointer fields. For example, the next pointer field 312 in the flexible storage block 310 may store a block address of the flexible storage block 320. Linking of the flexible storage blocks into a block link may allow data clusters to be distributed across these flexible storage blocks. Further, each configuration field in a specific flexible storage block may configure a size of the data clusters in the specific flexible storage block.

In some embodiments, each flexible storage block may contain an availability map 340 having a set of entries each of which may be associated with a specific data cluster in the flexible storage block. The entries in the availability map 340 may be initialized with a value that contains multiple "1" bits with no "0" bits. After the flash storage module allocates a data cluster, it may add an entry to the availability map 340 by performing a partial-update operation. The partial-update operation may change one or more "1" bits in the availability map 340 to "0" bits, with "1" meaning available and "0" meaning not available. Afterward, the flash storage module may traverse the availability map 340 to identify whether there is any space available in the flexible storage block. For example, the flash storage module may determine that there are three data clusters in the flexible storage block, since there are three entries in the availability map 340 having "0" bits. Based on the size of these data clusters, the flash storage module can determine how much storage space left in the flexible storage block.

In some embodiments, each flexible storage block may contain a validity map 350 having a set of entries each of which may be associated with a specific data cluster in the flexible storage block. The entries in the validity map 350 may be initialized with a value that contains multiple "1" bits with no "0" bits. After the flash storage module invalidate a data cluster, it may change an entry associated with the data cluster in the validity map 350 by performing a partial-update operation. The partial-update operation may change one or more "1" bits in the validity map 350 to "0" bits, with "1" meaning valid and "0" meaning invalid. Afterward, the flash storage module may traverse the validity map 350 to identify the invalidated data clusters in the flexible storage block.

In an illustrative example, a flexible storage block 310 may have a size of about 64 KB (kilo-bytes), and the CFG field 313 may define that each of the data clusters in the flexible storage block 310 having a size of 32 bytes. Further, the FAT table may utilize about 4 KB of space, with the availability map and the validity map taking about 256 bytes of space, in the flexible storage block 310. Thus, the remaining usable space of the flexible storage block 310 may be around 59 KB; and the flash storage module may construct about 1800 data clusters based on the remaining usable space in the flexible storage block 310.

In some embodiments, after a flexible storage block has gone through multiple rounds of updates, there might be a large number of data clusters in the flexible storage block that are invalid and taking up storage spaces. In this case, the flash storage module may conduct a reconstruct process to rebuild the flexible storage block. Specifically, the flash storage module may utilize the availability map 340 and the validity map 350 in the flexible storage block to determine a percentage of the data clusters in the flexible storage block that are invalid. For example, the flash storage module may identify a total number of data clusters in the flexible storage block by counting the entries in the availability map 340 that are associated with the allocated data clusters. The flash storage module may then identify a number of invalid data clusters by counting the entries in the validity map that are marked as invalid. Upon a determination that the percentage of invalid data clusters is above a particular and configurable threshold (e.g., 50%), the flash storage module may initiate the reconstruction process.

In some embodiments, the flash storage module may allocate a new flexible storage block 330 in the flexible storage volume 301 to reconstruct the flexible storage block 310. The flash storage module may identify the valid data clusters (e.g., data clusters 314, 318, 319, and 317, assuming the modified data could be stored in two data clusters, or data clusters 314, 318, 319, and 324) in the flexible storage block 310 based on its validity map, and allocate an equal number of data clusters (e.g., data clusters 334, 335, 336, and 337) in the new flexible storage block 330. Afterward, the flash storage module may copy the data stored in the valid data clusters of the flexible storage block 310 to the newly allocated data clusters in the new flexible storage block. For example, the flash storage module may copy data cluster 314 to data cluster 334, data cluster 318 to data cluster 335, data cluster 319 to data cluster 336, and data cluster 317 to data cluster 337. Afterward, the flash storage module may set up the cluster links among the data clusters. For example, if in the flexible storage block 310, the data cluster 315 becomes invalid for having its second pointer referencing the data cluster 318, the flash storage module may construct the cluster link in the flexible storage block 330 by having the data cluster 334 directly referencing the data cluster 335.

Figure 4:
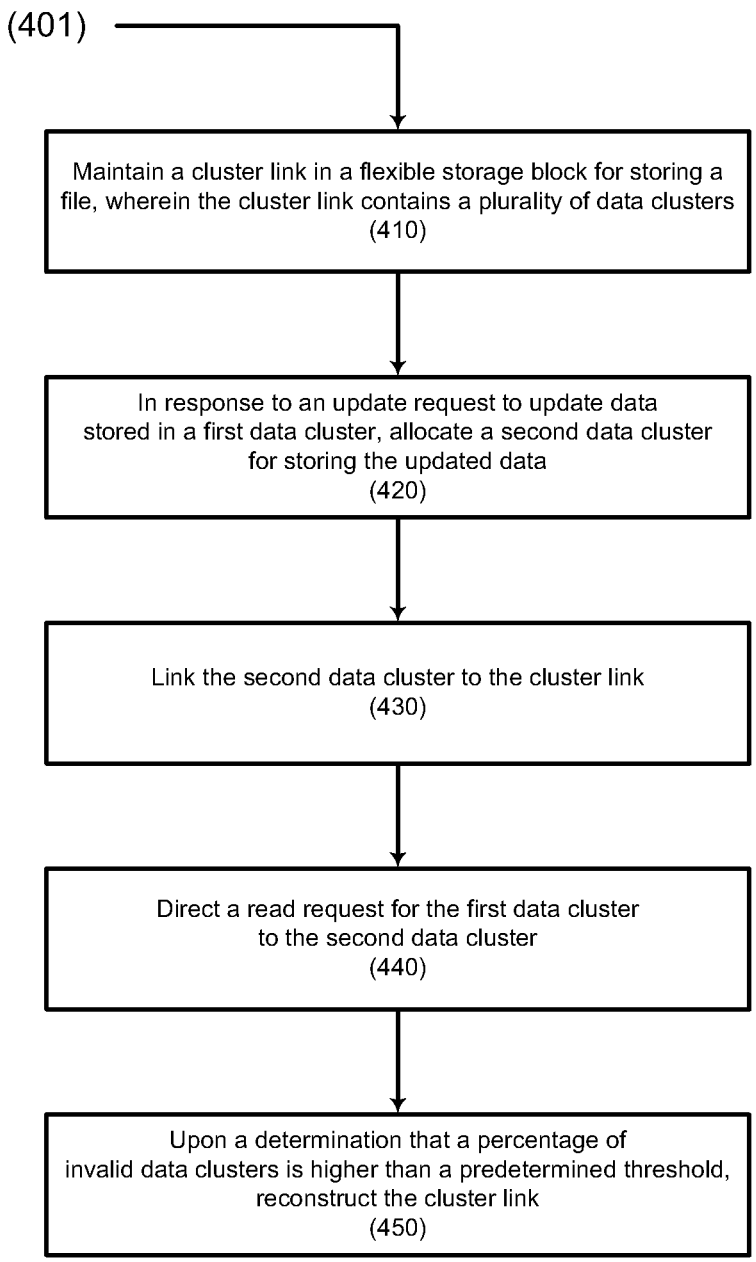
FIG. 4 shows a flow diagram of an illustrative embodiment of a process to update data stored in a flexible storage block.

FIG. 4 shows a flow diagram of an illustrative embodiment of a process to update data stored in a flexible storage block. The process 401 may include one or more operations, functions, or actions as illustrated by blocks 410, 420, 430, 440, and 450, which may be performed by hardware, software and/or firmware. The various blocks are not intended to be limiting to the described embodiments. For example, for this and other processes and methods disclosed herein, the operations performed in the processes and methods may be implemented in differing order.

Furthermore, the outlined operations are only provided as examples, and some of the operations may be optional, combined into fewer operations, or expanded into additional operations without detracting from the essence of the disclosed embodiments. Although the blocks are illustrated in a sequential order, these blocks may also be performed in parallel, and/or in a different order than those described herein. In some embodiments, machine-executable instructions for the process 401 may be stored in memory or other tangible non-transitory computer-readable storage medium, executed by a processor, and/or implemented in a flexible storage management system.

At block 410 ("Maintain a cluster link in a flexible storage block to store a file, wherein the cluster link links together a plurality of data clusters"), a flash storage module of a flexible storage management system may be configured to maintain a cluster link in a flexible storage block to store a file. The cluster link may contain a plurality of data clusters which utilize storage spaces (or are storage spaces) provided by one or more solid state devices. Further, the flash storage module may allocate the plurality of data clusters in the flexible storage block, and each of the plurality of data clusters may contain a corresponding first pointer and a corresponding second pointer. The flash storage module may form the cluster link by linking the plurality of data clusters. Specifically, for two data clusters that may be adjacent to each other in the cluster link, one data cluster's first pointer may refer to the other data cluster.

In some embodiments, the flash storage module may mark each of the plurality of data clusters' second pointer with a default/initial value indicating validity. The default/initial value may contain one or more "1" bits with no "0" bits. The flash storage module may also add a FAT entry to a file allocation table (FAT) in the flexible storage block to associate the file with the cluster link. The flash storage module may then store the file in the plurality of data clusters of the cluster link. Upon receiving a read request to access the file, the flash storage module may traverse the plurality of data clusters by first locating the cluster link based on the FAT entry. During traversing the cluster link, for a specific data cluster in the cluster link, upon a determination that the specific data cluster's second pointer indicates the specific data cluster is valid, the flash storage module may continue traversing the plurality of data clusters utilizing the specific data cluster's first pointer. Upon a determination that the specific data cluster's second pointer indicates the specific data cluster is not valid, the flash storage module may continue traversing the plurality of data clusters utilizing the specific data cluster's second pointer.

At block 420 ("In response to a request to update data stored in a first data cluster, allocate a second data cluster to the cluster link to store the updated data"), the flash storage module may receive an update request to update data stored in a first data cluster amongst the plurality of data clusters. Rather than applying the update directly on the first data cluster, the flash storage module may allocate a second data cluster to store the updated data. In other words, the second data cluster may be a newly created data cluster and is not one of the plurality of data clusters originally in the cluster link.

At block 430 ("Link the second data cluster to the cluster link"), the flash storage module may link the second data cluster to the cluster link. The flash storage module may assign the first data cluster's first pointer to the second data cluster's first pointer, and update the first data cluster's second pointer to refer to the second data cluster. Thus, the second data cluster may take the first data cluster's place in the cluster link, and the updated second pointer in the first data cluster may indicate that the first data cluster being invalid. In other words, the linking of the second data cluster to the cluster link invalidates the first data cluster in the cluster link.

In some embodiments, the update request may request to append data to the file. In this case, the flash storage module may allocate a third data cluster to the cluster link to store the appended data. Specifically, the flash storage module may update the first pointer of the tail data cluster in the cluster link to point to the third data cluster. Thus, the third data cluster may be located at the end of the cluster link, and may be deemed the new tail data cluster of the cluster link. In some embodiments, the update request may request to delete data stored in a fourth data cluster of the cluster link. In this case, the flash storage module may identify a next data cluster that is subsequent to the fourth data cluster in the cluster link, and then update the fourth data cluster's second pointer to refer to the next data cluster.

At block 440 ("Direct a read request for the first data cluster to the second data cluster"), upon a determination that the first data cluster's second pointer does not contain the default/initial value, the flash storage module may direct a request for the first data cluster to the second data cluster using the first data cluster's second pointer. Specifically, the flash storage module may also evaluate the second data cluster's second pointer for validity.

At block 450 ("Upon a determination that a percentage of invalid data clusters is higher than a threshold, reconstruct the cluster link"), upon a determination that a percentage of invalid data clusters in the plurality of data clusters is higher than a particular and configurable threshold, the flash storage module may reconstruct the cluster link based on those of the plurality of data clusters that are valid. For example, the flash storage module may allocate a set of data clusters in another flexible storage block, and copy the valid data clusters in the flexible storage block to the set of data clusters. Afterward, the flash storage module may form the cluster link by linking the set of data clusters using each of the set of data clusters' corresponding first pointer.

Figure 5:
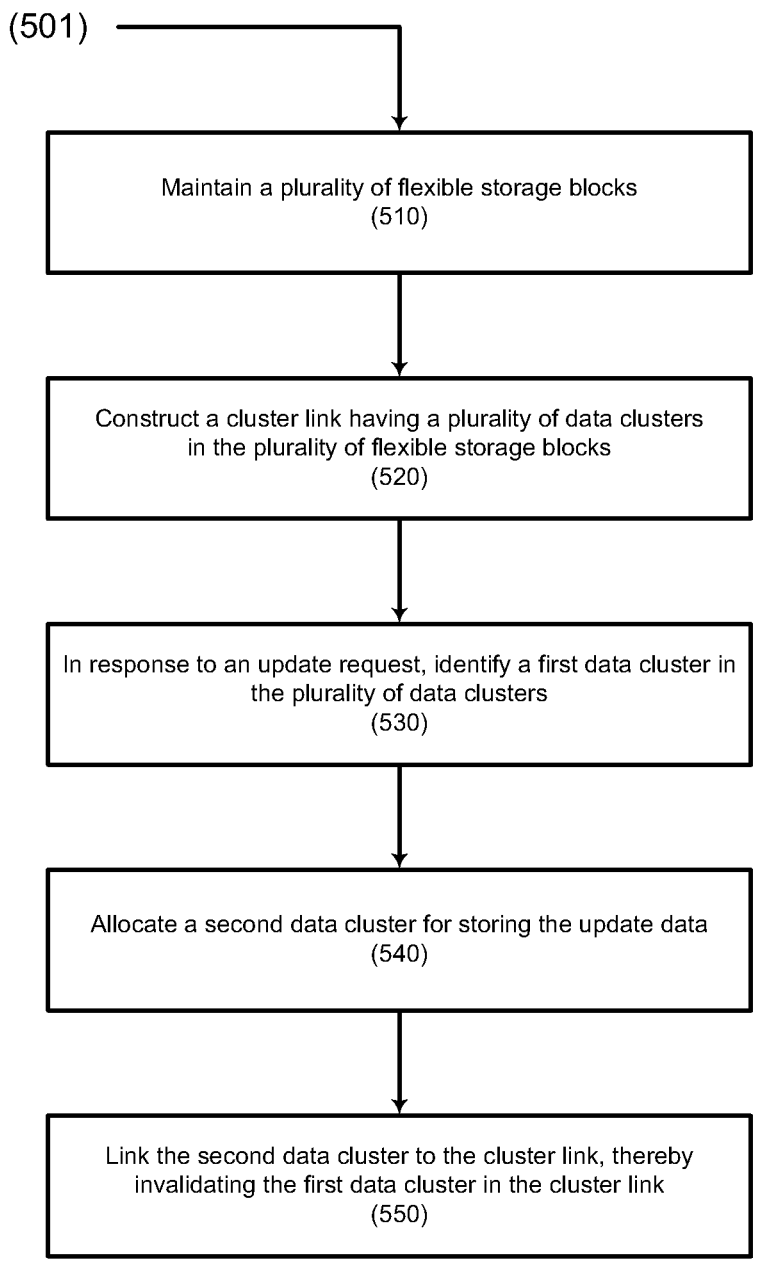
FIG. 5 shows a flow diagram of an illustrative embodiment of a process to maintain a flexible storage volume having multiple flexible storage blocks.

FIG. 5 shows a flow diagram of an illustrative embodiment of a process to maintain a flexible storage volume having multiple flexible storage blocks. The process 501 may include one or more operations, functions, or actions as illustrated by blocks 510, 520, 530, 540, and 550, which may be performed by hardware, software and/or firmware. The various blocks are not intended to be limiting to the described embodiments. For example, for this and other processes and methods disclosed herein, the operations performed in the processes and methods may be implemented in differing order.

Furthermore, the outlined operations are only provided as examples, and some of the operations may be optional, combined into fewer operations, or expanded into additional operations without detracting from the essence of the disclosed embodiments. Although the blocks are illustrated in a sequential order, these blocks may also be performed in parallel, and/or in a different order than those described herein. In some embodiments, machine-executable instructions for the process 501 may be stored in memory or other tangible non-transitory computer-readable storage medium, executed by a processor, and/or implemented in a flexible storage management system.

At block 510 ("Maintain a plurality of flexible storage blocks"), a flexible storage management system may be configured to maintain a flexible storage volume having a plurality of flexible storage blocks that are utilizing storage spaces provided by one or more solid state devices. With respect to a specific flexible storage block in the flexible storage volume, the specific flexible storage block may contain a configuration field to configure a cluster size associated with a plurality of data clusters in the specific flexible storage block. The specific flexible storage block may contain an index field to refer to another flexible storage block in the flexible storage volume.

In some embodiments, the specific flexible storage block may contain an availability map for the purpose of identifying available space, allocating new data clusters, and storing data. The specific flexible storage block may also contain a validity map for identifying those data clusters in the each of the plurality of specific flexible storage block that contain valid data. The specific flexible storage block may further contain a file allocation table (FAT) having a FAT entry which associates a file with a cluster link in the specific flexible storage block. Alternatively, the flexible storage volume may maintain the FAT for associating the file with the cluster link.

At block 520 ("Construct a cluster link having a plurality of data clusters in the plurality of flexible storage blocks"), the flash storage module may construct a cluster link to store a file. The cluster link may contain a plurality of data clusters each of which is located in one of the plurality of flexible storage blocks. In some embodiments, in response to a read request to access the file, the flash storage module may traverse the plurality of data clusters to retrieve data associated with the file. Specifically, upon a determination that the specific data cluster in the cluster link is valid, the flash storage module may continue the traversing of the plurality of data clusters following a first link direction indicated by the specific data cluster. The first link direction may be a first pointer in the specific data cluster. Further, upon a determination that the specific data cluster is not valid, the flash storage module may continue the traversing of the plurality of data clusters following a second link direction indicated by the specific data cluster. The second link may be a second pointer in the specific data cluster.

At block 530 ("In response to an update request, identify a first data cluster in the plurality of data clusters"), in response to an update request to update the file, the flash storage module may identify a first data cluster in the plurality of data clusters that is associated with the updated data in the file. At block 540 ("Allocate a second data cluster to store updated data"), the flash storage module may allocate a second data cluster in any one of the plurality of flexible storage blocks that has available space to store the updated data; and assign the first data cluster's first link direction to the second data cluster's first link direction.

At block 550 ("Link the second data cluster to the cluster link, thereby invalidating the first data cluster in the cluster link"), the flash storage module may link the second data cluster to the cluster link by assigning the first data cluster's second link direction to refer to the second data cluster. Specifically, the assigning of the first data cluster's second link direction may involve updating one or more "1" bits in the second link direction to "0" bits, and the linking of the second data cluster to the cluster link invalidates the first data cluster in the cluster link.

FIG. 16 is a block diagram of an illustrative embodiment of a computer program product 600 to implement a method to update data stored in a storage block. Computer program product 600 may include a signal bearing medium 602. Signal bearing medium 602 may include one or more sets of executable instructions 604 that, when executed by, for example, a processor, may provide the features and operations described above. Thus, for example, referring to FIG. 1, the flexible storage management system and/or the flash storage module may undertake one or more of the operations shown in at least FIG. 4 in response to the instructions 604.

In some implementations, signal bearing medium 602 may encompass a non-transitory computer readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, referring to FIG. 1, computer program product 600 may be wirelessly conveyed to the flexible storage management system 110 by signal bearing medium 602, where signal bearing medium 602 is conveyed by communications medium 610 (e.g., a wireless communications medium conforming with the IEEE 802.11 standard). Computer program product 600 may be recorded on non-transitory computer readable medium 606 or another similar recordable medium 608.

Figure 7:
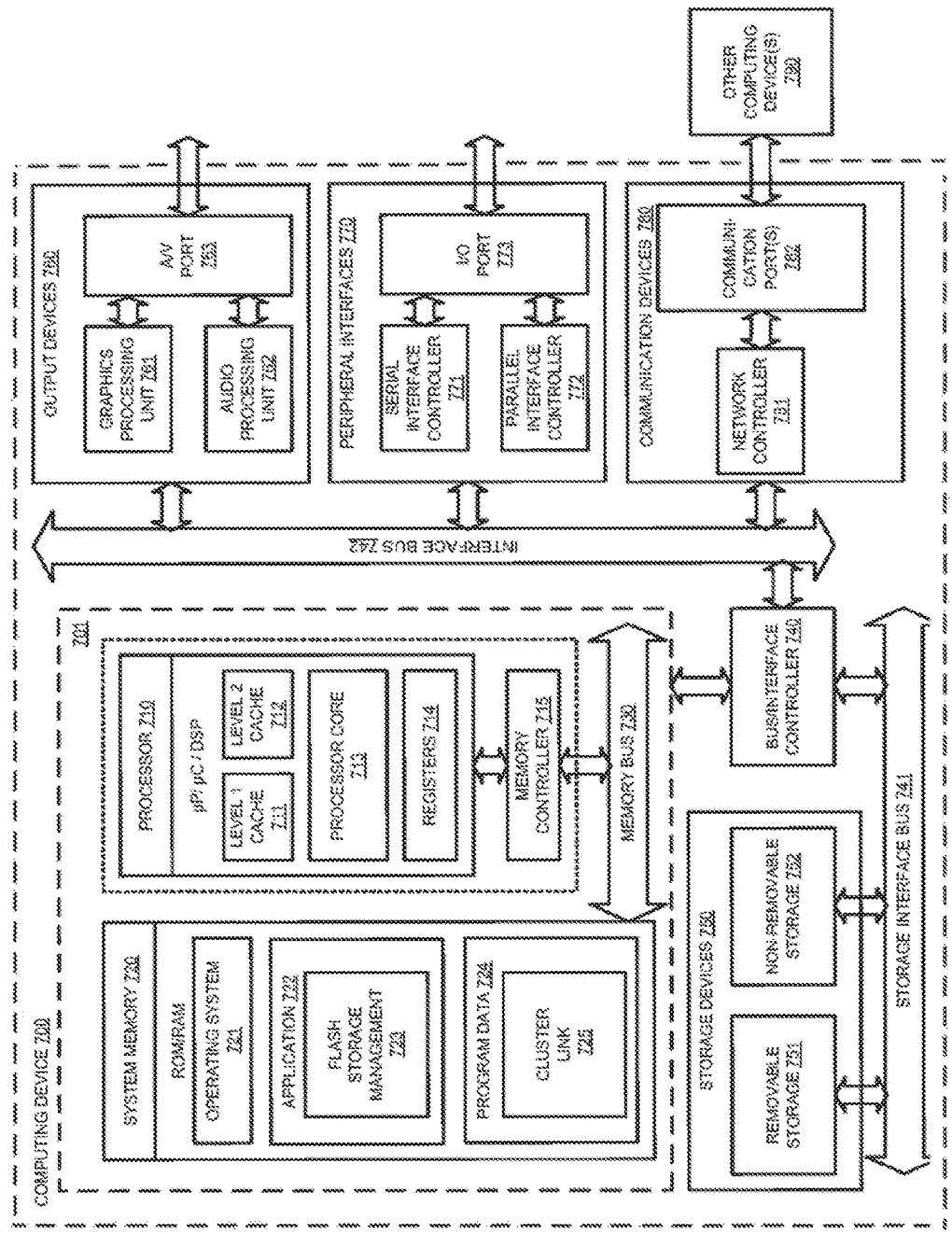
FIG. 7 shows a block diagram of an illustrative embodiment of an example computer system, all arranged in accordance to at least some embodiments of the present disclosure.

FIG. 7 shows a block diagram of an illustrative embodiment of an example computing device 700. In a very basic configuration 701, the computing device 700 may include one or more processors 710 and a system memory 720. A memory bus 730 may be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. The system memory 720 may include an operating system 721, one or more applications 722, and program data 724. The application 722 may include a flash storage management application 723 that is arranged to perform the operations as described herein including at least the operations described with respect to the process 401 of FIG. 4 and/or described elsewhere in this disclosure. The program data 724 may include cluster link 725 to be accessed by the flash storage management application 723. In some embodiments, the flash storage module 122 of FIG. 1 may be implemented as the application 722 to operate with the program data 724 on the operating system 721. Specifically, the flash storage module 122 may construct the cluster link 725 to store data for a file. This described basic configuration is illustrated in FIG. 7 by those components within dashed line 701.

Computing device 700 may have additional features or functionality, and additional interfaces to facilitate communications between basic configuration 701 and any required devices and interfaces. For example, a bus/interface controller 740 may be used to facilitate communications between basic configuration 701 and one or more data storage devices 750 via a storage interface bus 741. Data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 720, removable storage devices 751, and non-removable storage devices 752 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 742 for facilitating communication from various interface devices (e.g., output devices 760, peripheral interfaces 770, and communication devices 780) to basic configuration 701 via bus/interface controller 740. Example output devices 760 include a graphics processing unit 761 and an audio processing unit 762, which may be configured to communicate to various external devices such as a display or speakers via one or more A/V ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782. In some implementations, computing device 700 includes a multi-core processor, which may communicate with the host processor 710 through the interface bus 742.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to update data stored in a storage block, comprising:

maintaining, by a flash storage module, a cluster link in the storage block to store a file, wherein the cluster link links together a plurality of data clusters that are storage spaces provided by one or more solid state devices, and each of the plurality of data clusters includes a corresponding first pointer and a corresponding second pointer;

in response to a first request to update data stored in a first data cluster amongst the plurality of data clusters, allocating, by the flash storage module, a second data cluster to store the updated data;

assigning the first data cluster's first pointer to the second data cluster's first pointer; and linking, by the flash storage module, the second data cluster to the cluster link by updating the first data cluster's second pointer to refer to the second data cluster, wherein the updated first data cluster's second pointer invalidates the first data cluster in the cluster link.

2. The method as recited in claim 1, wherein the maintaining the cluster link comprises:

forming the cluster link by linking the plurality of data clusters, wherein for a third data cluster and a fourth data cluster adjacent to each other in the cluster link, the third data cluster's first pointer refers to the fourth data cluster; and marking each of the plurality of data clusters' second pointer with a default value indicating validity, wherein the default value contains one or more "1" bits with no "0" bits.

3. The method as recited in claim 2, wherein the maintaining the cluster link further comprises:

adding an entry to a file allocation table (FAT) in the storage block, wherein the entry associates the file with the cluster link;

storing the file in the plurality of data clusters; and in response to receiving a request to access the file, traversing the plurality of data clusters by locating the cluster link based on the entry.

4. The method as recited in claim 2, further comprising:
in response to a determination that the first data cluster's second pointer does not contain the default value, directing a request for the first data cluster to the second data cluster using the first data cluster's second pointer.

5. The method as recited in claim 3, wherein the traversing the plurality of data clusters comprises:

for a specific data cluster in the cluster link:

in response to a first determination that the specific data cluster's second pointer indicates the specific data cluster is valid, traversing the plurality of data clusters utilizing the specific data cluster's first pointer; and in response to a second determination that the specific data cluster's second pointer indicates the specific data cluster is not valid, traversing the plurality of data clusters utilizing the specific data cluster's second pointer.

6. The method as recited in claim 1, further comprising:
in response to a second request to append data to the file, allocating a third data cluster to the cluster link to store the appended data, wherein the third data cluster is located at an end of the cluster link.

7. The method as recited in claim 2, further comprising:
in response to a second request to delete data stored in the third data cluster, updating the third data cluster's second pointer to refer to the fourth data cluster.

8. The method as recited in claim 3, further comprising:
in response to a determination that a percentage of invalid data clusters in the plurality of data clusters is higher than a threshold, reconstructing the cluster link based on those of the plurality of data clusters that are valid.

9. The method as recited in claim 8, wherein the reconstructing the cluster link comprises:

allocating a set of data clusters in another storage block, wherein each of the set of data clusters contains data copied from a corresponding data cluster amongst those of the plurality of data clusters that are valid; and forming the reconstructed cluster link by linking the set of data clusters using each of the set of data clusters' corresponding first pointer.

10. A method to store data in a storage volume, comprising:

maintaining, by a flash storage module, a plurality of storage blocks that utilize storage spaces provided by one or more solid state devices;

constructing, by the flash storage module, a cluster link to store a file, wherein the cluster link links together a plurality of data clusters, each of which is a storage location that is located in one of the plurality of storage blocks, and each of the plurality of data clusters includes a corresponding first link direction and a corresponding second link direction;

in response to an update request to update the file, identifying, by the flash storage module, a first data cluster in the plurality of data clusters that is associated with updated data in the file;

allocating, by the flash storage module, a second data cluster in any one of the plurality of storage blocks that has available space to store the updated data; and linking, by the flash storage module, the second data cluster to the cluster link by assigning the first data cluster's second link direction to refer to the second data cluster, wherein the assigning the first data cluster's second link direction invalidates the first data cluster in the cluster link.

11. The method as recited in claim 10, wherein the maintaining the plurality of storage blocks includes maintaining, for each of the plurality of storage blocks:

a configuration field to configure a cluster size associated with each of the plurality of data clusters;

an availability map to identify available space in the each of the plurality of storage blocks that are available to store data; and a validity map to identify those data clusters in the each of the plurality of storage blocks that contain valid data.

12. The method as recited in claim 10, wherein for a first storage block and a second storage block that are linked to each other, maintaining the plurality of storage blocks includes maintaining an index field of the first storage block to refer to the second storage block.

13. The method as recited in claim 10, wherein the storage volume is configured with a file allocation table (FAT) having a FAT entry which associates the file with the cluster link, and the method further comprising:

in response to a read request to access the file, traversing the plurality of data clusters to retrieve data associated with the file, wherein for a specific data cluster in the plurality of data clusters:

in response to a first determination that the specific data cluster is valid, continuing the traversing of the plurality of data clusters following the corresponding first link direction indicated by the specific data cluster; and in response to a second determination that the specific data cluster is not valid, continuing the traversing of the plurality of data clusters following the corresponding second link direction indicated by the specific data cluster.

14. The method as recited in claim 10, wherein the allocating the second data cluster comprises:

assigning the first data cluster's first link direction to the second data cluster's first link direction.

15. The method as recited in claim 10, wherein the assigning the first data cluster's second link direction includes updating one or more "1" bits in the second link direction to "0" bits.

16. A system to manage flash data storage, comprising:
a solid state device configured to provide a plurality of flash pages; and
a flash storage module coupled with the solid state device, wherein the flash storage module is configured to:
maintain a storage block that utilizes storage spaces provided by the solid state device,
construct a cluster link to store a file in the storage block, wherein the cluster link links together a plurality of data clusters, each of which utilizes one of the plurality of flash pages to store data associated with the file,
in response to a request to update data stored in a first data cluster amongst the plurality of data clusters, allocate a second data cluster in the storage block to store the updated data, and
link the second data cluster to the cluster link by a marking of the first data cluster as invalid, wherein the marking of the first data cluster involves maintenance of any "0" bits in the plurality of flash pages as "0" bits rather than a change of the "0" bits to "1" bits.

17. The system as recited in claim 16, wherein the flash storage module is further configured to allocate the second data cluster without an update of the data stored in the first data cluster and associated with the file.

18. The system as recited in claim 16, wherein the flash storage module is further configured to link the second data cluster to the cluster link by copying the first data cluster's association with a next data cluster in the cluster link to the second data cluster.

19. A non-transitory computer-readable storage medium that includes a set of instructions stored thereon which, in response to execution by a computing processor, cause the computing processor to perform or control performance of a method to update data stored in a storage block, the method comprising:
maintaining, by a flash storage module, a cluster link in the storage block to store a file, wherein the cluster link links together a plurality of data clusters that are storage spaces provided by one or more solid state devices, and each of the plurality of data clusters includes a corresponding first pointer and a corresponding second pointer;
in response to a first request to update data stored in a first data cluster amongst the plurality of data clusters, allocating, by the flash storage module, a second data cluster to the cluster link to store the updated data;
assigning the first data cluster's first pointer to the second data cluster's first pointer; and
linking, by the flash storage module, the second data cluster to the cluster link by updating the first data cluster's second pointer to refer to the second data cluster, wherein the updated first data cluster's second pointer invalidates the first data cluster in the cluster link.

20. A non-transitory computer-readable storage medium that includes a set of instructions stored thereon which, in response to execution by a computing processor, cause the computing processor to perform or control performance of a method to store data in a storage volume, the method comprising:
maintaining, by a flash storage module, a plurality of storage blocks that utilize storage spaces provided by one or more solid state devices;
constructing, by the flash storage module, a cluster link to store a file, wherein the cluster link links together a plurality of data clusters, each of which is a storage location that is located in one of the plurality of storage blocks, and each of the plurality of data clusters includes a corresponding first link direction and a corresponding second link direction;
in response to an update request to update the file, identifying, by the flash storage module, a first data cluster in the plurality of data clusters that is associated with updated data in the file;
allocating, by the flash storage module, a second data cluster in any one of the plurality of storage blocks that has available space to store the updated data; and
linking, by the flash storage module, the second data cluster to the cluster link by assigning the first data cluster's second link direction to refer to the second data cluster, wherein the assigning the first data cluster's second link direction invalidates the first data cluster in the cluster link.

* * * * *

UNITED STATES PATENT AND TRADEMARK OFFICE
CERTIFICATE OF CORRECTION

PATENT NO. : 9,563,363 B2  Page 1 of 1
APPLICATION NO. : 14/435747
DATED : February 7, 2017
INVENTOR(S) : Chang It is certified that error appears in the above-identified patent and that said Letters Patent is hereby corrected as shown below:

In the Specification

In Column 1, Line 7, delete "§371" and insert -- § 371 --, therefor.

In Column 14, Line 6, delete "FIG. 16" and insert -- FIG. 6 --, therefor.

Signed and Sealed this
Second Day of May, 2017

Michelle K. Lee
*Director of the United States Patent and Trademark Office*